US009996333B2

(12) United States Patent
Kim et al.

(10) Patent No.: US 9,996,333 B2
(45) Date of Patent: Jun. 12, 2018

(54) APPARATUS AND METHOD FOR AUTOMATING THE INSTALLATION AND CONFIGURATION OF INFRASTRUCTURE

(71) Applicant: SAMSUNG SDS CO., LTD., Seoul (KR)

(72) Inventors: Jae-Hong Kim, Seoul (KR); Jun-Youn Joo, Seoul (KR); Han-Hwee Cho, Seoul (KR); Young-Gi Kim, Seoul (KR); Ju-Seok Yun, Seoul (KR); Se-Joong Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 89 days.

(21) Appl. No.: 15/061,669

(22) Filed: Mar. 4, 2016

(65) Prior Publication Data

US 2017/0115977 A1 Apr. 27, 2017

(30) Foreign Application Priority Data

Oct. 27, 2015 (KR) .......................... 10-2015-0149332

(51) Int. Cl.
*G06F 9/44* (2018.01)
*G06F 9/445* (2018.01)
(52) U.S. Cl.
CPC .................. *G06F 8/61* (2013.01); *G06F 9/44* (2013.01); *G06F 8/71* (2013.01); *G06F 9/44505* (2013.01)
(58) Field of Classification Search
None
See application file for complete search history.

(56) References Cited

U.S. PATENT DOCUMENTS

2001/0039655 A1* 11/2001 Elledge ...................... G06F 8/61
717/170
2002/0166001 A1* 11/2002 Cheng ........................ G06F 8/62
710/1

(Continued)

FOREIGN PATENT DOCUMENTS

EP          2 881 856 A1      6/2015
KR    10-2013-0048904 A       5/2013
WO        2014/020771 A1      2/2014

OTHER PUBLICATIONS

Cristina Gacek, Software Reuse Methods, Techniques, and Tools, 2002, Springer.*

(Continued)

*Primary Examiner* — Lewis A Bullock, Jr.
*Assistant Examiner* — Tina Huynh
(74) *Attorney, Agent, or Firm* — Sughrue Mion, PLLC

(57) ABSTRACT

Provided are an apparatus for automating the installation and configuration of infrastructure. The apparatus comprises, an installation information management module which receives installation information of an open-source solution and manages the installation information in a tree structure based on a parent-child relationship, an environment setting management module which receives environment setting information of equipment and manages the environment setting information in a tree structure based on a parent-child relationship, and an installation package management module which generates an installation package and an installation automation script using the installation information and the environment setting information.

29 Claims, 15 Drawing Sheets

(56) References Cited

U.S. PATENT DOCUMENTS

| | | | | |
|---|---|---|---|---|
| 2004/0255291 | A1* | 12/2004 | Sierer | G06F 8/61 |
| | | | | 717/174 |
| 2005/0172284 | A1* | 8/2005 | Dandekar | G06F 8/61 |
| | | | | 717/175 |
| 2008/0097629 | A1* | 4/2008 | Weatherhead | G05B 17/02 |
| | | | | 700/67 |
| 2008/0154965 | A1* | 6/2008 | Pedersen | G06F 8/36 |
| 2009/0249283 | A1 | 10/2009 | Bourdon | |
| 2009/0300641 | A1* | 12/2009 | Friedman | G06F 11/3664 |
| | | | | 718/104 |
| 2011/0296391 | A1* | 12/2011 | Gass | G06F 8/72 |
| | | | | 717/168 |
| 2012/0151488 | A1* | 6/2012 | Arcese | G06F 3/04812 |
| | | | | 718/101 |
| 2013/0031542 | A1* | 1/2013 | Arcilla | G06F 9/44505 |
| | | | | 717/177 |
| 2013/0139146 | A1* | 5/2013 | Bickle | G06F 17/30914 |
| | | | | 717/174 |
| 2014/0123126 | A1* | 5/2014 | Hsu | G06F 8/61 |
| | | | | 717/174 |
| 2015/0143328 | A1* | 5/2015 | Cope | G06Q 10/063 |
| | | | | 717/102 |
| 2015/0143331 | A1 | 5/2015 | Matsubara et al. | |

OTHER PUBLICATIONS

Communication issued by the Korean Intellectual Property Office dated Feb. 6, 2018 in counterpart Korean Patent Application No. 10-2015-0149332.

* cited by examiner tomcat.name = TOMCAT;
tomcat.description = Servlet, JSP Container;
tomcat.port = 8080;

FIG. 3B

```
apache.name = APACHE;
apache.description = HTTP Server;
apache.port = 80;
```

FIG. 3C

```
mysql.name = MySQL;
mysql.description = RELATIONAL DATABASE MANAGEMENT SYSTEM (RDBMS);
mysql.port = 3306;
```

FIG. 4A

```
tomcat.file.binary = apache-tomcat-8.0.28-windows-x64.zip;
tomcat.file.url = http://apache.mirror.cdnetworks.com/tomcat/tomcat-
8/v8.0.28/bin/apache-tomcat-8.0.28-windows-x64.zip;
tomcat.file.version = 8.0.28;
tomcat.file.os = win64;
```

FIG. 4B

```
apache.file.binary = httpd-2.4.17.tar.gz;
apache.file.url = ;
apache.file.version = 2.4.17;
apache.file.os = linux;
```

FIG. 4C

```
mysql.file.binary = mysql-5.6.27-linux-glibc2.5-x86_64.tar.gz;
mysql.file.url =;
mysql.file.version =;
mysql.file.os =;
```

FIG. 5A

```
apache.command.install = install.sh;
```

FIG. 5B

```
#!/bin/bash
tar zxvf httpd-2.4.17.tar.gz
cd httpd-2.4.17
./configure --prefix=/usr/local/apache/
make
make install
```

FIG. 5C

```
#!/bin/bash
tar zxvf ${apache.file.binary}
cd ${apache.file.binary.name}
./configure --prefix=${node.apache.directory}
make
make install
```

FIG. 6A

```
tomcat.cfg1.file = application.properties.template;
tomcat.cfg1.name = application.properties;
tomcat.cfg1.path = conf/;

tomcat.cfg2.file = workers.properties.template;
tomcat.cfg2.name = workers.properties;
tomcat.cfg2.path = conf/;

tomcat.cfg3.file = server.xml.template;
tomcat.cfg3.name = server.xml;
tomcat.cfg3.path = conf/;
```

FIG. 6B

```
~~~
~~~
** DB SETTING VALUE *************
resource.db.driverClassName=com.mysql.jdbc.Driver
resource.db.url=12.34.56.78:3306
resource.db.username=root
resource.db.password=root
~~~
~~~
```

FIG. 6C

```
~~~
~~~
** DB SETTING VALUE *************
resource.db.driverClassName=${mysql.add.jdbc}
resource.db.url=${node.mysql.01.ip}:${node.mysql.01.port}
resource.db.username=${node.mysql.01.cfg1.user}
resource.db.password= ${node.mysql.01.cfg1.password}
~~~
~~~
```

FIG. 7A

```
some_ops.command.start = bin/start.sh;
some_ops.command.stop = bin/stop.sh;
some_ops.command.status.check = bin/check.sh;
some_ops.command.status.result = OK;
```

FIG. 7B

```
~~~
~~~
mysql.add.jdbc = com.mysql.jdbc.Driver;
mysql.add.xxx1 = zzz1;
mysql.add.xxx2 = zzz2;
mysql.add.xxx3 = zzz3;
~~~
~~~
```

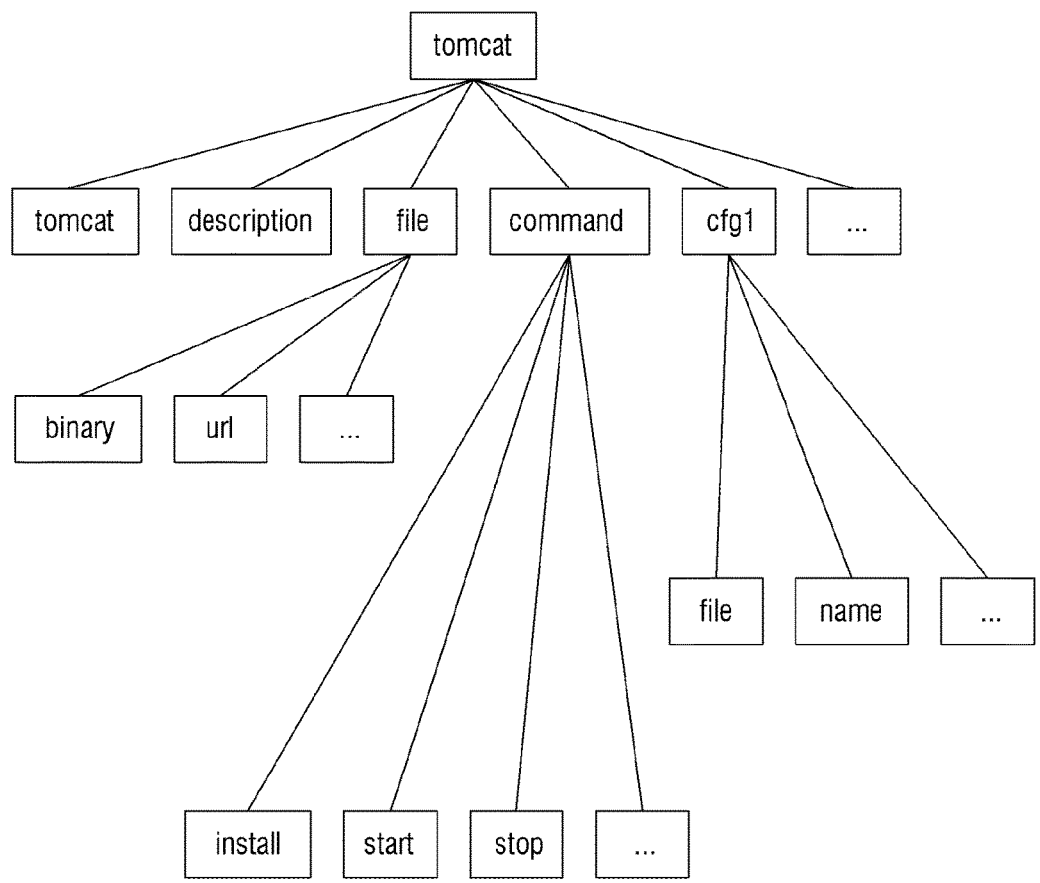

FIG. 10

```
node.apache.count = 10;
node.apache.directory = /home/apache/;

# node 1
node.apache.01.ip = xxx.xxx.xxx.1;
node.apache.01.port = 80;

# node 2
node.apache.02.ip = xxx.xxx.xxx.2;
node.apache.02.port = 80;

# node 3
node.apache.03.ip = xxx.xxx.xxx.3;
node.apache.03.port = 80;

……… node 10
node.apache.10.ip = xxx.xxx.xxx.10;
node.apache.10.port = 80;
```

FIG. 12

| Source | Src IP | SRC LOCATION | Destination | Dest IP | DEST LOCATION | Port |
|---|---|---|---|---|---|---|
| Apache Node #01 | xxx.xxx.xx.01 | DMZ | WAS Node #01 | xxx.xxx.xx.03 | INTERNAL NETWORK | 8009 |
| Apache Node #01 | xxx.xxx.xx.01 | DMZ | Node js Node #01 | xxx.xxx.xx.03 | INTERNAL NETWORK | 9010 |
| Apache Node #01 | xxx.xxx.xx.01 | DMZ | WAS Node #02 | xxx.xxx.xx.04 | INTERNAL NETWORK | 8009 |
| Apache Node #01 | xxx.xxx.xx.01 | DMZ | Node js Node #02 | xxx.xxx.xx.04 | INTERNAL NETWORK | 9010 |
| Apache Node #02 | xxx.xxx.xx.02 | DMZ | WAS Node #01 | xxx.xxx.xx.03 | INTERNAL NETWORK | 8009 |
| Apache Node #02 | xxx.xxx.xx.02 | DMZ | Node js Node #01 | xxx.xxx.xx.03 | INTERNAL NETWORK | 9010 |
| Apache Node #02 | xxx.xxx.xx.02 | DMZ | WAS Node #02 | xxx.xxx.xx.04 | INTERNAL NETWORK | 8009 |
| Apache Node #02 | xxx.xxx.xx.02 | DMZ | Node js Node #02 | xxx.xxx.xx.04 | INTERNAL NETWORK | 9010 |

FIG. 15

| | | |
|---|---|---|
| install.sh (TOTAL AUTOMATION SCRIPT) | 1) ACCESS INSTALLATION TARGET EQUIPMENT THROUGH NETWORK<br>2) TRANSMIT INSTALLATION PACKAGE (IP_package.tar) FOR EACH PIECE OF EQUIPMENT<br>3) EXECUTE AUTOMATION SCRIPT (IP_install.sh) FOR EACH PIECE OF EQUIPMENT | |
| install.tar (TOTAL INSTALLATION PACKAGE) | [EQUIPMENT 01] IP_package.tar (INSTALLATION PACKAGE FOR EACH PIECE OF EQUIPMENT) | Apache.tar<br>Tomcat.tar<br>.....<br>application.properties,<br>httpd.conf<br>... |
| | [EQUIPMENT 01] IP_install.sh (AUTOMATION SCRIPT FOR EACH PIECE OF EQUIPMENT) | 1) CONFIGURE INSTALLATION ENVIRONMENT<br>2) TEST LINKED SERVICE<br>3) INSTALL OPEN SOURCE<br>4) START SERVICE<br>5) CHECK SERVICE STATUS<br>6) INPUT INITIAL DATA |
| | [EQUIPMENT 02] IP_package.tar | |
| | [EQUIPMENT 02] IP_install.sh | |
| | [EQUIPMENT 03] IP_package.tar | ... |
| | [EQUIPMENT 03] IP_install.sh | |
| | ... | |

APPARATUS AND METHOD FOR AUTOMATING THE INSTALLATION AND CONFIGURATION OF INFRASTRUCTURE

This application claims priority from Korean Patent Application No. 10-2015-0149332 filed on Oct. 27, 2015 in the Korean Intellectual Property Office, the disclosure of which is incorporated herein by reference in its entirety.

BACKGROUND OF THE INVENTION

1. Field of the Invention

The present invention relates to an apparatus and method for automating the installation and configuration of infrastructure, and more particularly, to a method of automatically generating an installation package for each piece of equipment using installation information of various open-source solutions and environment setting information of one or more pieces of equipment on which the open-source solutions are to be installed and configured and an apparatus for performing the method.

2. Description of the Related Art

In the past, expensive equipment and expensive commercial solutions were used to establish a system. For example, Unix, SAN Storage, Oracle real application cluster (RAC), etc. were installed on expensive equipment to secure availability and security. In addition, the number of solutions that should be installed on equipment was relatively small, and the number of pieces of equipment on which solutions should be installed was relatively small. Further, since most of the solutions were commercial solutions, they usually provided a graphic user interface (GUI)-based installation environment. Therefore, it was not difficult to establish a system.

Recently, however, the amount of data that should be processed has increased geometrically. Therefore, "scale-out," instead of "scale-up," has become an essential requirement for the establishment of infrastructure. In addition, with the development of technologies related to a cloud distribution environment and virtual machines, various open-source solutions are being installed on inexpensive equipment or virtual machines instead of expensive equipment and expensive commercial solutions, thereby securing availability and security and reducing costs. For example, Linux or a virtual machine is run on inexpensive equipment, and then MySQL, MySQL high availability (MHA), Percona, etc. are installed on Linux or the virtual machine to improve performance through micro-service architecture (MSA), clustering configuration, etc.

To this end, however, various open-source solutions should be installed on one or more pieces of equipment. Therefore, the time required for installation managers to learn knowledge related to open-source solutions and to install the open-source solutions on each piece of equipment has actually increased significantly. In addition, necessary settings for the installation and configuration of the open-source solutions have increased, thereby increasing the probability that an error will occur in the process of installing the open-source solutions. Moreover, since most open-source solutions are based on a command line interface (CLI), they usually do not provide convenient functions for users of the open-source solutions. In this regard, there is a need for a method of establishing infrastructure by automatically installing and configuring various open-source solutions on one or more pieces of equipment.

SUMMARY OF THE INVENTION

Aspects of the present invention provide an apparatus and method for automating the installation and configuration of infrastructure.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided an apparatus for automating the installation and configuration of infrastructure. The apparatus comprises an installation information management module which receives installation information of an open-source solution and manages the installation information in a tree structure based on a parent-child relationship, an environment setting management module which receives environment setting information of equipment and manages the environment setting information in a tree structure based on a parent-child relationship, and an installation package management module which generates an installation package and an installation automation script using the installation information and the environment setting information.

According to another aspect of the present invention, there is provided a method of automating the installation and configuration of infrastructure. The method comprises, receiving installation information of an open-source solution and managing the installation information in a tree structure based on a parent-child relationship, receiving environment setting information of equipment and managing the environment setting information in a tree structure based on a parent-child relationship, and generating an installation package and an installation automation script using the installation information and the environment setting information.

According to still another aspect of the present invention, there is provided an apparatus for automating the installation and configuration of infrastructure, the apparatus comprises, a network interface, one or more processors, a memory which loads a computer program executed by the processors, and a storage which stores installation information of an open-source solution and environment setting information of equipment. The computer program comprises, an installation information management operation which receives the installation information and manages the installation information in a tree structure based on a parent-child relationship; an environment setting management operation which receives the environment setting information and manages the environment setting information in a tree structure based on a parent-child relationship; and an installation package management operation which generates an installation package and an installation automation script using the installation information and the environment setting information.

BRIEF DESCRIPTION OF THE DRAWINGS

The above and other aspects and features of the present invention will become more apparent by describing in detail exemplary embodiments thereof with reference to the attached drawings, in which:

FIG. 2 is a flowchart illustrating a method of managing installation information which is open-source solution information according to an embodiment of the present invention;

FIGS. 3A through 7C are diagrams illustrating an example of installation information used in an embodiment of the present invention;

FIG. 8 is a diagram illustrating the installation information organized in a tree structure based on a parent-child relationship;

FIG. 10 is a diagram illustrating an example of environment setting information used in an embodiment of the present invention;

FIG. 12 is a diagram illustrating a method of automatically generating a firewall list according to an embodiment of the present invention;

FIG. 15 is a conceptual diagram illustrating an installation package and an automation script according to an embodiment of the present invention;

DETAILED DESCRIPTION OF THE INVENTION

Figure 1:
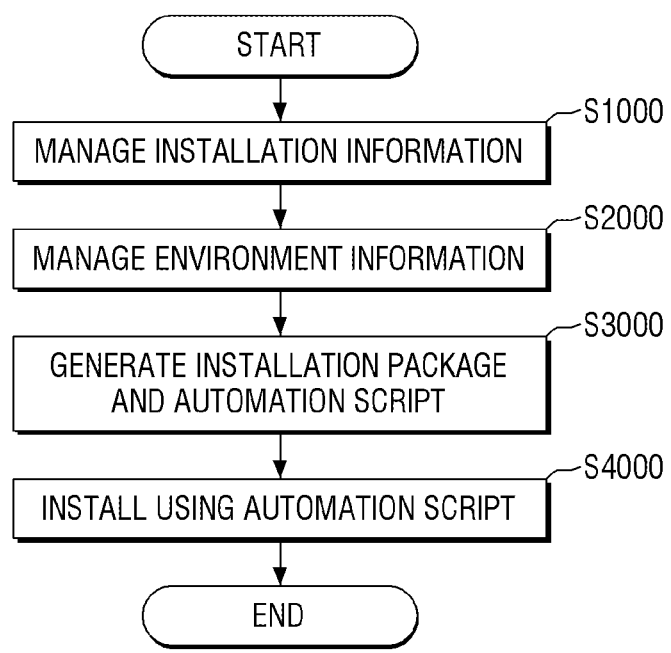
FIG. 1 is a flowchart illustrating a method of automating the installation and configuration of infrastructure according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The term "open-source solution," as mentioned herein, refers to an open-source solution in the form of middleware and an open-source solution that needs to be installed on equipment. Examples of the open-source solution in the form of middleware include Apache, Tomcat, Redis, RabbitMQ, Zookeeper, Kafka, and Flume.

To install such an open-source solution, however, basic relevant knowledge, an installation method, a start and stop method, a monitoring method, an environment setting method, a clustering and duplex configuration method, etc. had to be learned in advance. Therefore, there has been a lot of difficulty installing an open-source solution. For example, to establish the infrastructure for driving a particular solution, 14 types of open sources had to be installed 33 times, and 5 days was taken only to install 64 setting files and 400 or so setting items. Embodiments of the present invention designed to minimize such inconvenience will hereinafter be described in greater detail with reference to the attached drawings.

FIG. 1 is a flowchart illustrating a method of automating the installation and configuration of infrastructure according to an embodiment of the present invention.

To install various open-source solutions on one or more pieces of equipment, information about the open-source solutions and information about the pieces of equipment need to be organized in advance. That is, open-source solution information such as a binary file for installing each open-source solution, an installation/start/stop/monitoring method, an initial data generation method if necessary, and other user setting items should be defined in advance and established as a database. In addition, equipment information such as the number of pieces of equipment on which each open-source solution is to be installed, Internet protocols (IPs), and other essential information should be defined in advance and established as a database.

Hereinafter, the open-source solution information will be referred to as installation information, and the equipment information will be referred to as environment setting information. First, installation information of various open-source solutions is received from a user and managed (operation S1000). In addition, environment setting information of one or more pieces of equipment on which each open-source solution needs to be installed is received from the user and managed (operation S2000). Then, an installation package and an automation script are automatically generated for each piece of equipment using the installation information and the environment setting information defined in advance (operation S3000). Once the installation package and the automation script are generated for each piece of equipment, the preparation for installation is completed. Then, the installation package and the automation script generated automatically are uploaded to a particular one of pieces of equipment on which an open-source solution is to be installed or to external equipment. After the uploading of the installation package and the automation script, the automation script is executed such that the open-source solution is installed and configured automatically on each piece of installation target equipment connected to the particular equipment or the external equipment through a network (operation S4000).

Through the above installation process, the process of installing various types of open-source solutions on a large number of pieces of equipment can be automated with minimum user input. In addition, since information and files needed to install various open-source solutions are managed in an integrated manner, the time required for an installation manager to learn basic knowledge about the open-source solutions can be reduced. Also, since the environment setting information of each piece of equipment is managed in an integrated manner, an installation package that can be installed on multiple servers at a time regardless of the number of servers can be generated automatically. This can reduce the time required for the installation manager to install an open-source solution through network-based integrated installation and installation sequence management, a dependency check between open-source solutions, a firewall test, generation of initial data, etc.

In conclusion, the present invention can simplify the process of installing an open-source solution by receiving setting information and environment setting information from a user, generating an automatic installation package, and performing automatic installation using the automatic installation package. Thus, the present invention improves convenience in terms of the integrated management of the setting information and the environment setting information and increases efficiency in terms of automatic installation, compared with conventional technologies that simply modify an environment setting in an infrastructure environment in which each open-source solution is already installed or that manage an installation package for a particular open source and provide an installation function to a number of servers.

Figures 2, 3A:
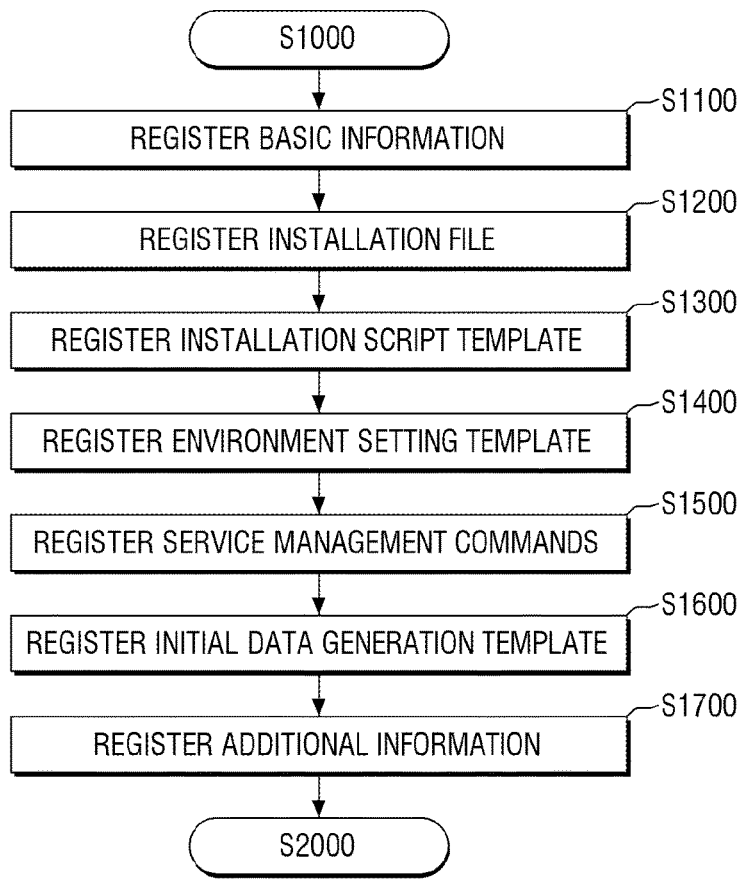

FIG. 2 is a flowchart illustrating a method of managing installation information which is open-source solution information according to an embodiment of the present invention.

Installation information used in the present invention has a unique identifier (ID). In addition, the installation information has a tree structure. That is, the installation information of an open-source solution is provided based on a parent-child relationship under a unique ID of a highest node representing the open-source solution. To help understand the tree structure, information of the tree structure will be described using "." as a delimiter. The installation information of the tree structure can also be managed using various delimiters such as "/" and "|" in addition to ".".

Referring to FIG. 2, the installation information that should be managed for each open-source solution is as follows.

First, basic information of an open-source solution is received from a user (operation S1100). The basic information may include the name, description and service port of the open-source solution. The basic information can be summarized as in Table 1 below.

TABLE 1

| Item | Unique Identifier (UID) | Description |
| --- | --- | --- |
| Name (*) | opensource.name | Name of an open-source solution |
| Description | opensource.description | Rough description of the open-source solution (optional) |
| Service port | opensource.port | Basic port used if the open-source solution is serviced through a particular port |

The name of the open-source solution is an essential input item. However, the description or service port of the open-source solution can be omitted depending on the open-source solution. This is because the description of the open-source solution is an input item intended to provide information to a user and the service port may not exist depending on the open-source solution. Hereinafter, items that need to be essentially input will be marked with (*) in tables. Once the basic information of the open-source solution is input, it is relatively less likely to be registered additionally or updated.

The basic information of the open-source solution will now be described using specific examples. First, the basic information of Tomcat provided by Apache Software Foundation (ASF) may be input as follows. Referring to FIG. 3A, tomcat.name is "Tomcat," tomcat.description is "Servlet, JSP Container," and tomcat.port is "8080." Likewise, the basic information of Apache may be input as follows. Referring to FIG. 3B, apache.name is "Apache," apache.description is "HTTP Server," and apache.port is "80." Likewise, the basic information of MySQL provided by Oracle may be input as follows. Referring to FIG. 3C, mysql.name is "MySQL," mysql.description is "relational database management system (RDBMS)," and mysql.port is "3306."

The basic information of the open-source solution has been described above using the examples of FIGS. 3A through 3C. Here, the service port is a port basically used by an open-source solution, and most open-source solutions are allowed to change their service ports through settings. The service port included in the basic information is a port to be applied when no settings have been made. However, the environment setting information which is the equipment information can set an open-source solution to be serviced not at the basic port but at another port depending on equipment. This will be described in detail later.

Referring back to FIG. 2, an installation file of the open-source solution is received from the user (operation S1200). The installation file of the open-source solution may be directly uploaded by the user in the form of a binary file. In some cases, a uniform resource locator (URL) from which the installation file can be downloaded may be received from the user. Additionally, version information of the installation file and an installable operating system may be received. These can be summarized as in Table 2 below.

TABLE 2

| Item | Unique Identifier (UID) | Description |
| --- | --- | --- |
| File (*) | opensource.file.binary | Binary file of an open-source solution |
| File URL (*) | opensource.file.url | URL from which the open-source solution can be downloaded |
| Version | opensource.file.version | Version information of the file of the open-source solution |
| Operating system | opensource.file.os | Installable operating system for the file of the open-source solution |

When the installation file is received from the user, one of the binary file and the URL from which the file can be downloaded should be essentially received. In addition, the version information of the file and the installable operating system should be received. Here, the binary file for installation refers to a file distributed by open-source solution makers in the form of tar, gz, tgz, war, rpm, etc. If an open-source solution depends on a particular module or library, the particular module or library may be included in the binary file and uploaded as the installation file.

The installation file of the open-source solution will now be described using specific examples. The installation file of Tomcat may be input as follows. Referring to FIG. 4A, "apache-tomcat-8.0.28-windows-x64.zip" was input as a value of tomcat.file.binary, and "http://apache.mirror.cdnetworks.com/tomcat/tomcat-8/v8.0.28/bin/apache-tomcat-8.0.28-windows-x64.zip" which is a file download address of an Apache Tomcat site was input as a value of tomcat-.file.url. Since the value of at least one of the binary file and the URL should be essentially input, both of the binary file and the URL can be input. If both the binary file and the URL are input, the value of the binary file may be preferentially used. Although the value of tomcat.file.binary is expressed as "apache-tomcat-8.0.28-windows-x64.zip" due to the limited paper space, it is actually a value stored after the file, not text, was directly uploaded by a user. In addition, tomcat.file.version indicating the version of Tomcat was input as "8.0.28," and tomcat.file.os indicating an installable operating system was input as "win64," that is, a 64-bit Windows operating system.

Likewise, the installation file of Apache may be input as follows. Referring to FIG. 4B, "httpd-2.4.17.tar.gz" was uploaded as apache.file.binary, apache.file.version indicating the version of the file was input as "2.4.17," and apache.file.os indicating an installable operating system was input as "linux." In the case of Apache, a binary file was uploaded, and an URL was omitted. Likewise, the installation file of MySQL may be input as follows. Referring to FIG. 4C, "mysql-5.6.27-linux-glibc2.5-x86_64.tar.gz" was uploaded as mysql.file.binary, and other information was omitted. It can be guessed from the file name that the version of MySQL is 5.6.26 and that an installable operating system is linux. However, since information about the version or the operating system can be omitted as mentioned earlier, only the binary file can be uploaded.

The installation file of the open-source solution has been described above using the examples of FIGS. 4A through 4C. Here, the version of the installation file is primarily designed to provide information. Therefore, when information about the installation file is received from a user, the version of the installation file can be omitted. However, the version of the installation file can be utilized to install an open-source solution on equipment by designating the version. This will be described in greater detail later. Likewise, the installable operating system is primarily designed to provide information. However, the installable operating system can be utilized to filter out and install the installation file of a necessary open-source solution according to an operating system of equipment on which the open-source solution is to be installed. Most open-source solution makers may distribute a different installation file according to whether the operating system is a Linux operating system or a Windows operating system. In some cases, they may distribute a different installation file according to whether the operating system is a 32-bit operating system or a 64-bit operating system. Therefore, installation files need to be managed according to operating systems. The basic information described above with reference to Table 1 and FIGS. 3A through 3C is relatively less likely to be modified after being registered once for an open-source solution. On the other hand, in the case of the information about the installation file described above with reference to Table 2 and FIGS. 4A through 4C, a number of installation files can be registered depending on the version of an open-source solution or the installable operating system. However, since the installation information is managed in a tree structure in the present invention, there is no problem with registering a number of installation files corresponding to different versions or operating systems. Registering various installation files according to versions and installable operating systems actually enables infrastructure to be established according to the operating system of equipment and the version of an open-source solution that needs to be installed.

Referring back to FIG. 2, an installation script template of the open-source solution is received from the user (operation S1300). Here, the installation script template of the open-source solution refers to a template of an installation script that is to be executed when the binary file registered above or the file downloaded using the URL is actually installed on equipment. For example, the installation script file may be a file with an extension of "sh" in the case of Linux and a file with an extension of "bat" in the case of Windows. A template file of such an installation script file is uploaded by the user. The installation script template can be summarized as in Table 3 below.

TABLE 3

| Item | Unique Identifier (UID) | Description |
| --- | --- | --- |
| Installation script template (*) | opensource.command.install | Script template file that stores commands to be executed when a binary file or a file downloaded from a URL is installed |

The installation script template of the open-source solution will now be described using specific examples. The installation script template of Apache may be input as follows. Referring to FIG. 5A, "install.sh" was input as a value of apache.command.install. However, "install.sh" merely indicates that an installation script template file named "install.sh" has been uploaded. To help fully understand an installation script template, the content of the installation script template file will be described. However, the content of an installation script file will first be described before the content of the installation script template file.

For example, an installation script may include commands for decompressing a binary file and performing configure, make, and make install. FIG. 5B illustrates a bash shell script for decompressing "httpd-2.4.17.tar.gz" which is an Apache binary file registered in the example of FIG. 4B and for installing the decompressed binary file at a path of "/user/local/apache/." Referring to FIG. 5B, a binary file is decompressed (line 2), and a decompressed directory is visited to set an installation path as an option (line 4), make (line 5), and make install (line 6). To install an open-source solution on multiple pieces of equipment, installation managers actually used to upload an installation script file having the content of FIG. 5B to a server and execute the installation script file. In the present invention, however, an installation script template file is generated by replacing some pieces of information in the installation script file with variables. For example, the value of "httpd-2.4.17.tar.gz" which is a binary file may be information related to an open-source solution and may be received as the variable of apache.file.binary in Table 2. In addition, "/usr/local/apache/" which is an installation path may be information related to equipment and may be received as the variable of node.apache.directory in the environment setting information which will be described later.

That is, a file that is to be actually uploaded is not an installation script in which a file and an installation path are hard-coded as in the example of FIG. 5B but a template file of an installation script in which a file and an installation path are included in the form of variables as in the example of FIG. 5C. Since the example of FIG. 5C is a template file of an installation script, it cannot be executed. However, the template file can be converted into a script file configured as in FIG. 5B by replacing each variable with an appropriate value. In the present invention, a user registers an installation script template file configured as in FIG. 5C by replacing installation information and environment setting information in a conventional installation script file configured as in FIG. 5B with variables. Later, for automatic installation, an installation script file is generated by replacing the variables of the installation script template file with values appropriate for each open-source solution and each piece of equipment and then executed to perform installation. To this end, the installation script template file itself should be written more complicatedly than the example of FIG. 5C such that the setting information and the environment setting information can be received and processed as variables. The script illustrated in FIG. 5C is merely an example script written as simple as possible in order to help understand the installation script template file. Therefore, an installation script template file may actually include a command, such as wget, for downloading a file from a URL and various commands for decompressing a file according to a method used to compress the file using a conditional statement. The installation script template file may also include a command for deleting a folder generated in the process of decompressing a file during installation after the completion of the installation. That is, more complicated and various commands may be included in the installation script template file than in the example of FIG. 5C, and FIG. 5C is merely an example.

In the present invention, the installation information related to an open-source solution and the environment setting information related to equipment are defined and managed separately in order to simplify an installation process itself and increase the reusability of a script file or a setting file used in the installation process by generating, in the installation process, a template that contains the information dependent on the open-source solution or the equipment as disclosed in the above example installation script. If an installation file and an installation path are received as variables, the reusability of an installation script is increased. Therefore, the installation script can be used when other similar open-source solutions are installed and when the above open-source solution is installed on other equipment Like the installation script file, the reusability of the setting file of the open-source solution can be increased by receiving the information dependent on the open-source solution and the information dependent on the equipment as variables that are later managed in the installation information and the environment setting information and generating a template using the received information. That is, infrastructure can be easily established by automating the installation of the infrastructure using an installation script template and automating the configuration of the infrastructure using an environment setting template. In addition, once the installation information of an open-source solution is organized, it can be reused to establish other infrastructure. Therefore, the time required to learn basic knowledge about using the open-source solution can be reduced. In this regard, the only maintenance required of an installation manager is to reflect any update on the version of the open-source solution in the installation information.

Referring back to FIG. 2, an environment setting template of the open-source solution is received from the user (operation S1400). Most open-source solution makers provide a setting file for setting the environment of an open-source solution. The environment setting file is not in a special format but in a format of most text files. The environment setting file stores items that can be set in a key-value form and values of the items. In some cases, the environment setting file may be provided not in a simple text file format but in an Extensible Markup Language (XML) format. However, there is not much difference in function between the text file format and the XML format. An environment setting template refers to a template of such an environment setting file. The environment setting template can be summarized as in Table 4 below.

TABLE 4

| Item | Unique Identifier (UID) | Description |
| --- | --- | --- |
| Environment setting template (*) | opensource.cfg1.file | Template file of an environment setting file of an open-source solution |
| Environment setting file name (*) | opensource.cfg1.name | Name of the environment setting file |
| Environment setting file path (*) | opensource.cfg1.path | Basic path at which the environment setting file should be stored |

In some cases, a number of environment setting templates may be received from the user. Here, the environment setting template files may be received using serial numbers such as cfg1 and cfg2. As shown in Table 4, the environment setting template file, the environment setting file name, and the environment setting file path are all essential input items. The environment setting template of the open-source solution will now be described using specific examples. The environment setting template of Tomcat may be input as follows. Referring to FIG. 6A, three environment setting template files for Tomcat were uploaded. However, the number of environment setting files actually used by Tomcat is more than three. Specifically, "application.properties.template" was uploaded as a template file of application.properties that contains information needed for linkage with an external application, and "workers.properties.template" was uploaded as a template file of workers.properties that contains information needed for load-balancing between Tomcat servers. In addition, "server.xml.template" was uploaded as a template file of server.xml that contains setting information of a Tomcat server. In FIG. 5A, "install.sh" was uploaded as an installation script template file. However, any file name and extension can be used freely as long as they can clearly indicate that the uploaded file is an installation script template file. For example, a file such as "apache.install.sh.template" can be uploaded. Whatever the file name or the extension is, the installation script template file is only a text file. Therefore, an appropriate name can be used as the file name of the installation script template file. Likewise, an environment setting template file can be managed using an appropriate name. In the example of FIG. 6A, an extension "template" was added to the name of an environment setting file in order to indicate that a file is a template file.

The files of FIGS. 5A and 6A are all template files. However, while only the installation script template file was uploaded in FIG. 5A, the environment setting file name and the environment setting file path were input in FIG. 6A in addition to each environment setting template file. This is because an environment setting file has to exist with a designated file name at a designated path in order to properly operate in an open-source solution. Therefore, an environment setting file can be generated in an installation process by converting each environment setting template file using the additionally input environment setting file name and environment setting file path. In FIG. 6A, only the environment setting template file named "application.properties-.template" was uploaded. Therefore, the content of the environment setting template file will now be described in order to help fully understand the environment setting template file. However, the content of an environment setting file will first be described before the content of the environment setting template file.

Referring to FIG. 6B, of the environment setting files, an environment setting file named application.properties contains setting information related to MySQL. The installation information, i.e., the open-source solution information and the environment setting information, i.e., the equipment information in an environment setting file should be distinguished from each other in the process of generating an environment setting template as in the process of generating an installation script template. The environment setting template file can be completed by changing the installation information and the environment setting information to appropriate variables. Like the installation script template file, the environment setting template file can be reused after being written once unless setting items of the environment setting file of an open-source solution are changed significantly. In FIG. 6B, items such as driverClassName, url, username, and password can be changed to variables. Referring to FIG. 6C, each item was changed to a variable. It can be understood from FIG. 6C that an environment setting template file of Tomcat refers to items of an environment setting file of MySQL as variables. Variables of the installation information and the environment setting information which can be used in the installation script template or the environment setting template, a method of defining the variables, and a method used by open-source solutions to refer to each other's variables will be described in greater detail later. Until now, a method of converting a conventional environment setting file into an environment setting template file and registering the environment setting template file and automatically generating an environment setting file at the time of installation by replacing variables of the environment setting template file with appropriate values using installation information related to an open-source solution and environment setting information related to equipment has been described with reference to FIG. 6C.

Referring back to FIG. 2, service management commands of the open-source solution are received from the user (operation S1500). Most open-source solutions provide an execution file used to identify the state of an open-source solution. The service management commands can be summarized as in Table 5 below.

TABLE 5

| Item | Unique Identifier (UID) | Description |
| --- | --- | --- |
| Service start command (*) | opensource.command.start | Start command |
| Service stop command (*) | opensource.command.stop | Stop command |
| Service status check command | opensource.command.status.check | Service status check command |
| Service status check result value | opensource.command.status.result | Service status check result value |

Of the service management commands, start and stop commands can be input simply by inputting a path of an execution file provided by an open-source solution. That is, there is no need for a user to write an execution file and upload the execution file. However, there are many open-source solutions that do not provide a service status check command and a service status check result value. Therefore, only the start and stop commands are essentially input as the service management commands. If necessary, the user may generate a service status check script and add the generated service status check script. The service management commands of the open-source solution will now be described using specific examples. The service management commands of a particular open-source solution may be input as follows. Referring to FIG. 7A, an open-source solution provides a "start.sh" script file for a start operation at a path of bin/and a "stop.sh" script for a stop operation at the path of bin/. In addition, the open-source solution provides a "check.sh" script file for a status check. When a character string "OK" is received after the execution of the "check.sh" file, it can be understood that the service is operating normally. The service management commands input here can be used later to check whether installation has been performed properly.

Referring back to FIG. 2, an initial data generation template of the open-source solution is received from the user (operation S1600). Depending on the open-source solution, initial data may have to be generated after the installation of the open-source solution. A template of a script to be executed here can be summarized as in Table 6 below.

TABLE 6

| Item | Unique Identifier (UID) | Description |
| --- | --- | --- |
| Initial data generation template | opensource.file.initdata | Script template file for generating initial data |

The initial data generation template is not an essential input item. If necessary, the initial data generation template can be uploaded by the user. Like a template file of an installation script, a template file of a conventional script file for generating initial data can be generated and registered by replacing items related to the installation information and the environment setting information in the initial data generation script file with variables. The template file of the initial data generation script file is the same as the installation script template file described above with reference to FIGS. 5A through 5C, and thus a detailed description thereof is omitted.

Referring back to FIG. 2, additional information of the open-source solution is received from the user (operation S1700). The additional information may be variables defined by the user out of necessity. The additional information can be summarized as in Table 7 below.

TABLE 7

| Item | Unique Identifier (UID) | Description |
| --- | --- | --- |
| Additional information | opensource.add.item name | Additional information |

In some cases, various variables other than the items summarized above may be needed. The additional information is an input item used to add these variables. That is, keys for storing variables may be placed and managed as lower nodes under a node "opensource.add." For example, a variables such as ${mysql.add.jdbc} of FIG. 6C used in the above description of the environment setting template may be defined under "add." Specifically, referring to FIG. 7B, "com.mysql.jdbc.Driver" was input as a value of mysql.add.jdbc which is the additional information of MySQL. Various other variables can also be managed as the additional information of the open-source solution for convenience of users.

Until now, the installation information which is the open-source solution information has been described in detail with reference to FIGS. 2 through 7B. In the installation information, the installation script template file and the environment setting template file for automating the installation and configuration of infrastructure are most important items to be managed. Various other pieces of information can also be managed as the installation information as will now be briefly described with reference to FIG. 8. In FIG. 8, information received through operations S1100 through S1700 for Tomcat is organized in a tree structure. However, this is merely an example used to show that the installation information related to an open-source solution can be managed in a tree structure, and the installation information or input items are not limited to this structure. If necessary, the installation information for each open-source solution can be structured in a different way, and various input items can be designated as variables as desired. However, if information about most open-source solutions is structured based on one standard as described above, these open-source solutions can be learned more quickly than when each of the open-source solutions is learned individually. In addition, operations S1100 through S1700 are illustrated in FIG. 2 as if they were performed sequentially. However, this is merely an example used to help understand the present invention. Since operations S1100 through S1700 are performed in order to receive the installation information from a user, they can be performed in any order. Since the installation information has been described until now, the environment setting information which is the equipment information will hereinafter be described.

Figure 9:
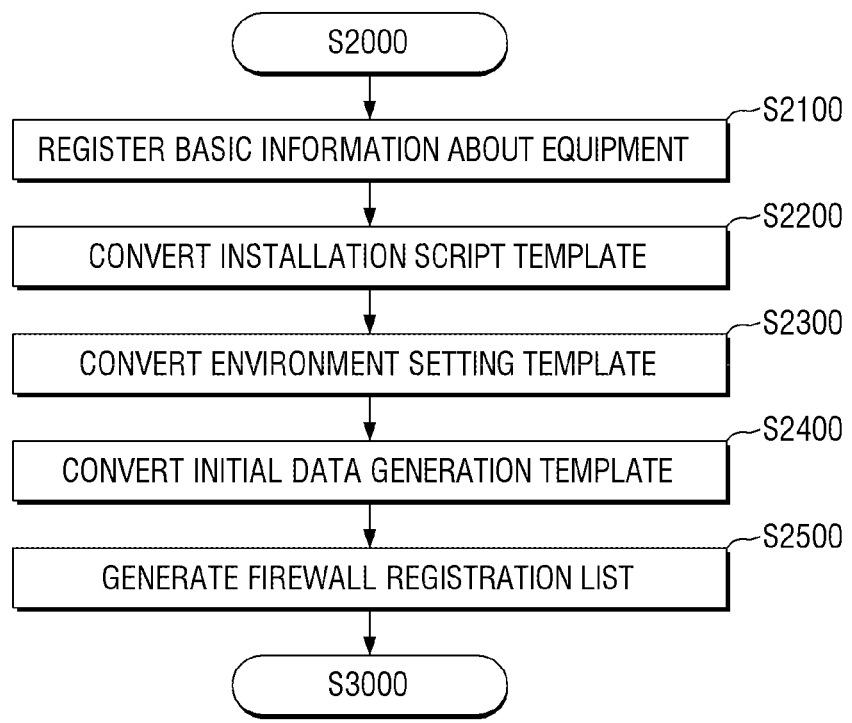
FIG. 9 is a flowchart illustrating a method of managing environment setting information which is equipment information according to an embodiment of the present invention.

FIG. 9 is a flowchart illustrating a method of managing environment setting information which is equipment information according to an embodiment of the present invention.

Referring to FIG. 9, basic information about equipment on which an open-source solution is to be installed is received from a user (operation S2100). The basic information about the equipment may include at least one of the number of pieces of equipment on which the open-source solution is installed, a path at which the open-source solution is to be installed, an IP of each piece of equipment, and a service port of the open-source solution. The basic information can be summarized as in Table 8 below.

TABLE 8

| Item | Unique Identifier (UID) | Description |
| --- | --- | --- |
| Equipment count (*) | node.opensource.count | Number of pieces of equipment on which an open-source solution is to be installed |
| Installation path (*) | node.opensource.directory | Installation path of the open-source solution |
| IP (*) | node.opensource.01.ip | IP of equipment on which the open-source solution is to be installed |
| Service port (*) | node.opensource.01.port | Service port of the open-source solution |

The basic information will now be described using a specific example. Referring to FIG. 10, a total of 10 nodes are required to install Apache, and the installation path is "/usr/local/apache/". In addition, IPs and ports used to service Apache are listed by node. Unlike the installation information of the open-source solution, the environment setting information of the equipment requires no more than the above information. This is because equipment-dependent information is only IP, service port and installation path. The environment setting information of the equipment can be organized in a tree structure as in FIG. 11. The number of pieces of equipment on which Apache is installed, the installation path, and the IP and service port of each piece of equipment can be found in the tree structure.

Next, an installation script template file of the open-source solution is converted using the installation information of the open-source solution and the input basic information about the equipment (operation S2200). The result is an executable script file having variables in the installation script template file replaced with values of the installation information of the open-source solution and the environment setting information of the equipment. That is, in the above example, the installation script template file of FIG. 5C is converted into the installation script file of FIG. 5B. Here, an individual file is generated for each piece of equipment and for each open source.

Next, an environment setting template file of the open-source solution is converted using the installation information of the open-source solution and the input basic information about the equipment (operation S2300). The result is an environment setting file having variables in the environment setting template file replaced with values of the installation information of the open-source solution and the environment setting information of the equipment. That is, in the above example, the environment setting template file of FIG. 6C is converted into the environment setting file of FIG. 6B. Here, an individual file is generated for each piece of equipment and for each open source.

Next, an initial data generation template of the open-source solution is converted using the installation information of the open-source solution and the input basic information about the equipment (operation S2400). The result is an initial data generation script file having variables in the initial data generation template file replaced with values of the installation information of the open-source solution and the environment setting information of the equipment. Since the initial data generation template is an optional item that can be omitted depending on the open-source solution, operation S2400 can be omitted in some cases.

Next, a firewall registration list is automatically generated (operation S2500). The firewall registration list can be automatically generated based on mapping information between open-source solutions. Here, the mapping information between open-source solutions is information generated based on the relationship in which the installation script template, environment setting template, and initial data generation template of each open-source solution refers to information of other open-source solutions. Referring to the example of FIG. 6C, all servers on which Tomcat is installed refer to an IP "${node.mysql.01.ip}" and a port "${node.mysql.01.port}" of equipment No. 1 on which MySQL is installed. That is, this information is stored as the mapping information between open-source solutions when an environment setting file is generated by converting an environment setting template of Tomcat. Then, since equipment on which Tomcat is installed should be able to connect to equipment No. 1 on which MySQL is installed, a firewall list for opening a firewall can be automatically generated using the mapping information.

Referring to FIG. 12, IPs and ports of multiple pieces of equipment which require firewall setting are listed by source equipment and destination equipment based on mapping information between open-source solutions. In the conventional art, installation managers set a firewall individually, apart from installing an open-source solution. According to an embodiment of the present invention, however, since information about the dependency between open sources is organized through template files, a firewall between pieces of equipment can be set automatically using this information. The example of FIG. 12 includes a firewall list generated automatically based on a case where an environment setting template of an open-source solution "Apache" refers to the IPs and ports of equipment No. 1 and equipment No. 2 on which "was" is installed and a firewall list generated automatically based on a case where the environment setting template of the open-source solution "Apache" refers to the IPs and ports of equipment No. 1 and equipment No. 2 on which "node js" is installed. The environment setting template file contains more firewall setting related information than the installation script template file and the initial data generation template file, and the installation script template file and the initial data generation template file refer to information of other open-source solutions relatively less.

Until now, the converting of the installation script template (operation S2200), the converting of the environment setting template (operation S2300), the converting of the initial data generation template (operation S2400), and the automatically generating of the firewall list using the relationship in which each open-source solution refers to information of other open-source solutions for variable replacement in the process of converting templates have been described. To automatically install and configure infrastructure, template files should be generated well. To this end, variables should be defined and managed according to certain rules so that a user can use the variables well. The installation information used in the present invention has a tree structure as described above with reference to FIGS. 8 and 11. Thus, the tree structure used in the present invention will now be described in greater detail.

Referring to FIG. 8, the installation information which is the open-source solution information is illustrated in a tree structure. Once determined, the tree structure of the installation information is applied to all open-source solutions. Since some input items are not essential input items, they can be excluded from the tree structure. However, the basic shape of the tree structure is fixed as illustrated in FIG. 8. Therefore, when a user uses variables to generate a template file, variables about the installation information may be used based on the fixed tree structure.

Figure 11:
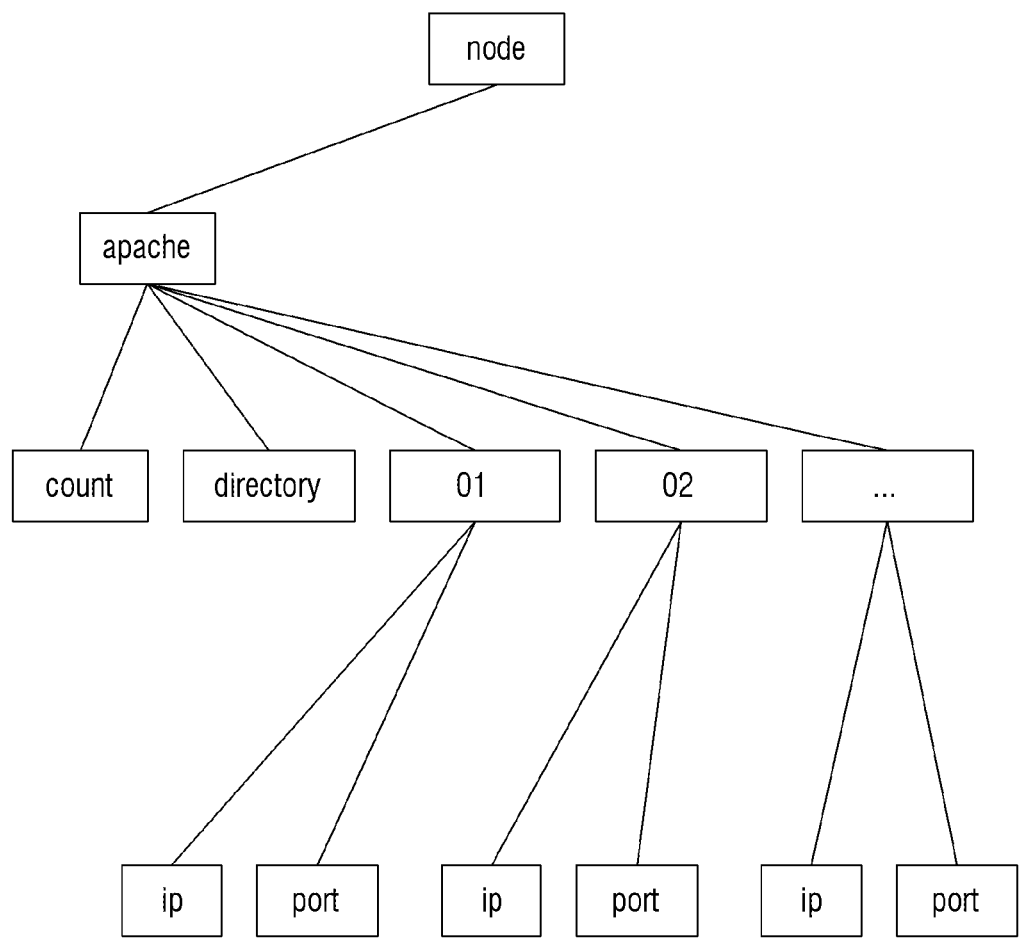
FIG. 11 is a diagram illustrating the environment setting information organized in a tree structure based on a parent-child relationship.

Referring to FIG. 11, the environment setting information which is the equipment information is illustrated in a tree structure. Since each node is given a serial number, the serial number of a particular node can be used to utilize the IP and port information of the particular node. That is, when a variable "${node.apache.01.ip}" is input, the IP of node No. 1 on which Apache is installed can be referred to. Variables such as ${node.mysql.01.ip} and ${node.mysql.01.port} used in FIG. 6C refer to the IP and port of node No. 1 on which MySQL is installed. When a particular open-source solution is to refer to the environment setting information of equipment on which another open-source solution is installed, node.opensource.node_number can be used.

In some cases, however, equipment on which open-source solution B is installed may have to refer to open-source solution A for a setting file of open-source solution B. In addition, there may be a number of environment setting templates as mentioned above in the description of the environment setting template of the open-source solution. In this case, variables may be defined as follows when information about a particular environment setting file is to be referred to. For example, "${node.mysql.01.cfg1.user}" is a method of expressing a variable that refers to a value of a variable having "user" registered as a key in environment setting file No. 1 of node No. 1 on which MySQL is installed. That is, since environment setting files of most open-source solutions are in the key-value form, keys are perceived as lower nodes of cfg1, and thus their values are queried. When the environment setting template of the open-source solution is converted into the environment setting file (operation S2300), a file such as application-.properties or http.conf may be generated for each piece of equipment. Here, if another open-source solution needs to refer to this information, the above variable definition method can be used. Referring to FIG. 7C, information indicating that "user" is a key and "root" is a value and information indicating that "password" is a key and "root" is a value are stored in setting file No. 1 of node No. 1 on which MySQL is installed. In addition, when information in the form of a list is needed, N which is a reserved word can be used instead of numbers. For example, when a variable is expressed like ${node.cassandra.N.ip}, IPs of all nodes on which Cassandra is installed can be obtained as information in the form of a list. This expression method is useful in the environment setting template that forms a cluster. The definition of the variables described until now can be summarized as in Table 9 below.

TABLE 9

| Unique Identifier (UID) | Description |
| --- | --- |
| ${opensource.item} | Query installation information of an open-source solution |
| ${node.opensource.item} | Query basic information included in environment setting information of equipment |
| ${node.oepnsource.number.item} | Query items of a node of a particular serial number on which the open-source solution is installed |
| ${node.oepnsource.number.cfg1.item} | Query items of a particular setting file of a node of a particular serial number on which the open-source solution is installed |
| ${node.oepnsource.N.item} | Query items of all nodes, on which the open-source solution is installed, in the form of a list |

An example of the definition of each variable in Table 9 is shown in Table 10. Using Table 10, most of the installation information of the open-source solution, the environment setting information of the equipment, and the information included in the environment setting file of the open-source solution can be approached as variables.

TABLE 10

| Unique Identifier (UID) | Description |
| --- | --- |
| ${apache.file.binary} | Installation file of Apache |
| ${node.apache.directory} | Path at which Apache is installed on equipment |
| ${node.mysql.01.ip} | IP of node No. 1 on which MySQL is installed |
| ${node.mysql.01.cfg1.user} | Value of an item having user as a key from among items of setting file |

TABLE 10-continued

| Unique Identifier (UID) | Description |
| --- | --- |
| | No. 1 of node No. 1 on which MySQL is installed |
| ${node.mysql.N.ip}$ | Convert IPs of all nodes on which MySQL is installed in the form of a list |

Users can generate template files according to the rules of the variables defined above. Then, variables registered in each template file are replaced with appropriate real values according to a tree structure. After all variables are replaced with real values, the conversion of the template files is terminated.

Until now, a method of converting a script file related to installation and an environment setting file related to configuration into template files in order to automate the installation and configuration of an open-source solution has been described. In this process, a method of setting installation information dependent on the open-source solution and environment setting information dependent on equipment as variables and defining the variables under certain rules in order to use the variables when generating a template file has also been described. Basically, a tree structure was used as a data structure, and variables were defined such that they could refer to information of other open-source solutions. However, the tree structure and the definition of the variables are merely an embodiment for automating the installation and configuration of infrastructure. Therefore, other data structures and variable definitions can be used. Once various template files included in the installation information which is the open-source solution information are converted into an installation script file, an environment setting file, and an initial data generation script file to be installed on each piece of equipment using the variables of the installation information and the environment setting information which is the equipment information, the preparation for installation is completed. The remaining work is to automatically generate an installation package and an automation script (operation S3000) for actual installation by using the generated files.

Figure 13:
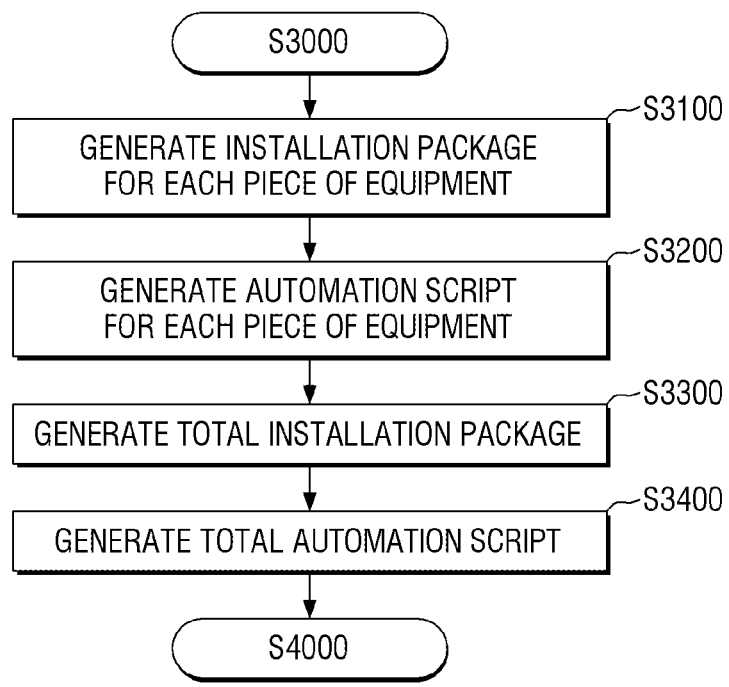
FIG. 13 is a flowchart illustrating a method of automatically generating an installation package and an automation script according to an embodiment of the present invention.

FIG. 13 is a flowchart illustrating a method of automatically generating an installation package and an automation script according to an embodiment of the present invention.

Referring to FIG. 13, an installation package is generated for each piece of equipment (operation S3100). The only operations that require user input are the inputting of installation information related to an open-source solution (operation S1100) and the inputting of environment setting information related to equipment (operation S2100). Operations following these operations are performed automatically. The installation package for each piece of equipment includes a binary file of the open-source solution to be installed on each piece of equipment or a file downloaded from a URL. Additionally, the installation package for each piece of equipment includes an environment setting file of the open-source solution to be installed on each piece of equipment.

Next, an automation script is generated for each piece of equipment (operation S3200). The automation script for each piece of equipment may include a command for generating an account/authority to configure an installation environment and a command for generating a directory. The automation script for each piece of equipment may also include a step for checking a linked service. Here, the linked service includes items such as an item indicating whether a network required for installation is working normally. The automation script for each piece of equipment may include an installation script of the open-source solution. The installation script of the open-source solution is generated by replacing variables of an installation script template file registered in operation S1300 (operation S2200). As in the example of FIG. 5B, the installation script may include commands for decompressing the binary file of the open-source solution and performing make and make install. Additionally, the automation script for each piece of equipment may include a command for copying an environment setting file generated by converting an environment setting template to a designated path. In the automation script for each piece of equipment, a script for starting the open-source solution and a script for checking service status may be executed. Lastly, if necessary, an initial setting data script obtained by converting an initial setting data template may be executed to input necessary information to the automation script for each piece of equipment.

Next, a total installation package is generated (operation S3300). The total installation package is a file generated by bundling up the installation package for each piece of equipment. The total installation package may additionally include the automation script for each piece of equipment.

Next, a total automation script is generated (operation S3400). The total automation script may include a command for connecting to equipment, which is to become a distribution server from among multiple pieces of installation target equipment, through a network, a command for uploading the total installation package to the equipment which is to become the distribution server, a command for decompressing the total installation package after the completion of the uploading, and a command for transmitting the installation package for each piece of equipment and the automation script for each piece of equipment to each piece of equipment and installing the open-source solution on each piece of equipment by executing the automation script for each piece of equipment. Accordingly, the open-source solution can be installed on each piece of equipment in parallel within a short time.

Figure 14:
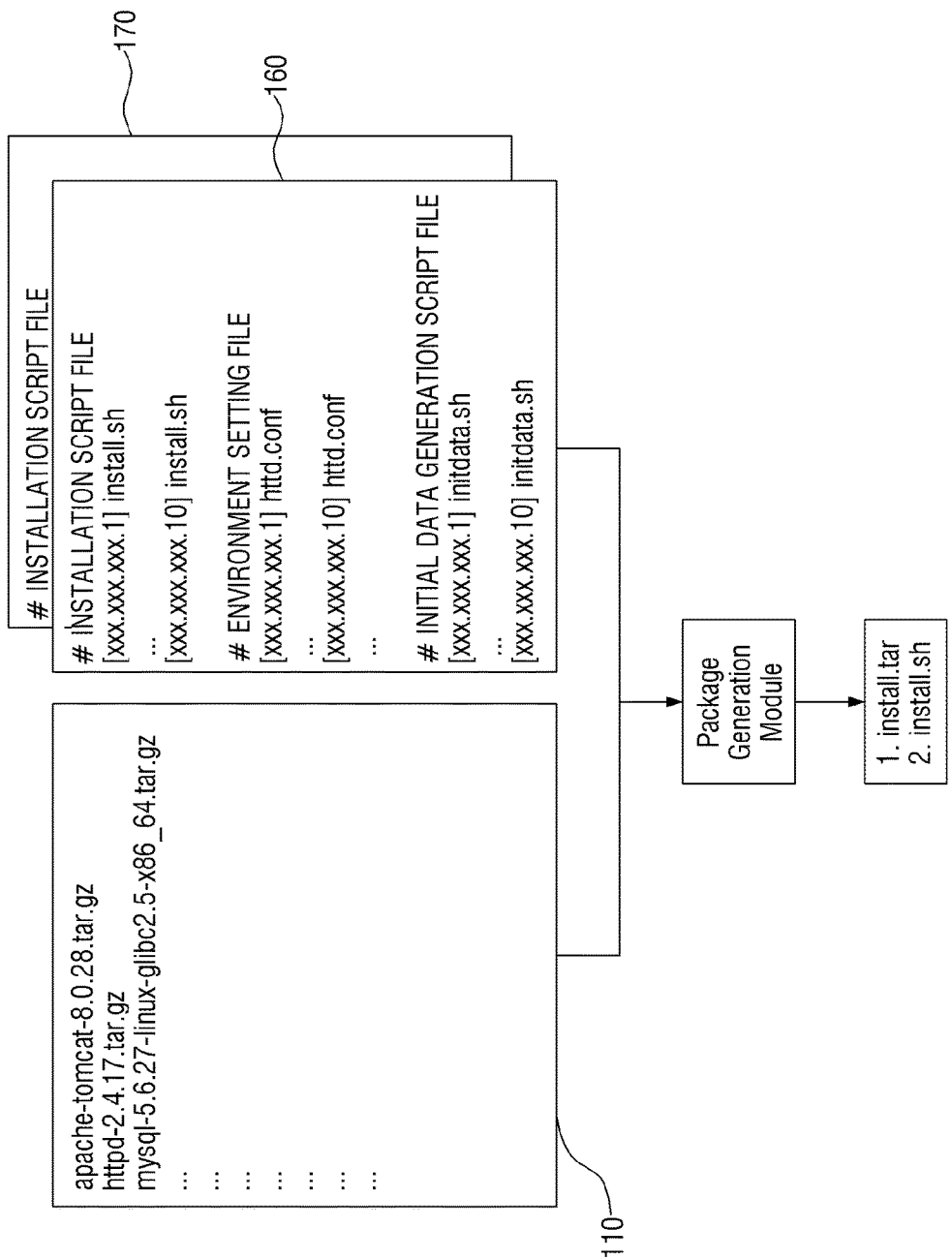
FIG. 14 is a conceptual diagram illustrating a method of automatically generating an installation package and an automation script according to an embodiment of the present invention.

FIG. 14 is a conceptual diagram illustrating a method of automatically generating an installation package and an automation script according to an embodiment of the present invention.

Referring to FIG. 14, a binary file 110 of each open-source solution and files generated by converting template files of each open-source solution are illustrated with IPs at the beginning. For example, a folder 160 containing an installation script file, an environment setting file, and an initial data generation script file of Apache and a folder 170 containing an installation script file, an environment setting file and an initial data generation script file of Tomcat are illustrated. The binary file 110 of each open-source solution and the files generated by converting the template files of each open-source solution may be collected by a package generation module to produce one total installation package and one total installation script.

FIG. 15 is a conceptual diagram illustrating an installation package and an automation script according to an embodiment of the present invention.

Referring to FIG. 15, commands to be executed mostly in a total automation script (install.sh) and commands to be executed mostly in an automation script (IP_install.sh) for each piece of equipment are illustrated. In the automation script for each piece of equipment, IP denotes an actual IP of each piece of equipment. That is, the automation script for each piece of equipment has a file name such as xx.xx.xx.1_install.sh. In addition, a list of files to be included in a total installation package (install.tar) and an installation package (IP_package.tar) for each piece of equipment are illustrated. If the total automation script and the total installation package file are generated automatically, a user can easily install various open-source solutions on multiple pieces of equipment in parallel at a time simply by executing the total automation script (operation S4000).

Figure 16:
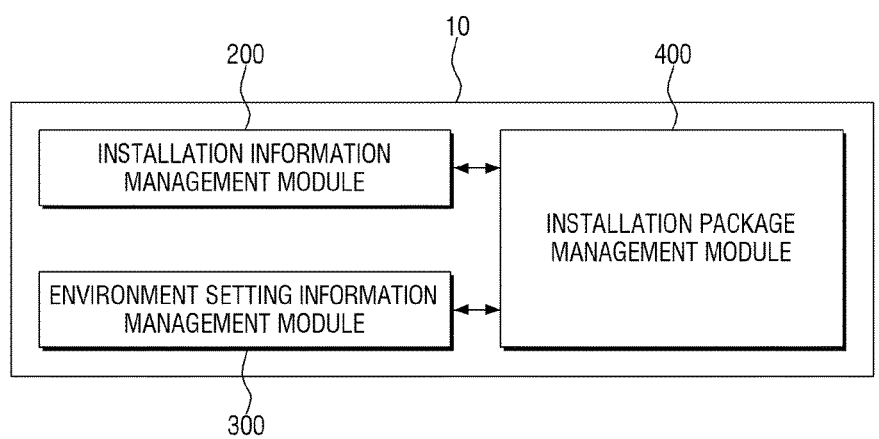
FIG. 16 is a block diagram of an apparatus for automating the installation and configuration of infrastructure according to an embodiment of the present invention.

FIG. 16 is a block diagram of an apparatus 10 for automating the installation and configuration of infrastructure according to an embodiment of the present invention.

Referring to FIG. 16, the apparatus 10 for automating the installation and configuration of infrastructure may include an installation information management module 200, an environment setting information management module 300, and an installation package management module 400.

The installation information management module 200 manages installation information of an open-source solution received from a user in a tree structure based on a parent-child relationship. Therefore, each item of the installation information may be given a unique identifier based on the tree structure, and a value of each item may be queried using the unique identifier. If each item of the installation is managed such that it can be approached as a variable, a template file can be generated by replacing the items of the installation information in an installation script required for installation or in an environment setting file of the open-source solution required for setting with the variables. Accordingly, an installation process can be simplified and performed easily.

The environment setting information management module 300 manages environment setting information of equipment received from the user in a tree structure based on a parent-child relationship. Therefore, each item of the environment setting information may be given a unique identifier based on the tree structure, and a value of each item may be queried using the unique identifier. In particular, since items included in an environment setting file of an open-source solution to be installed on each piece of equipment can also be accessed using unique identifiers, a particular open-source solution can refer to the items of the environment setting information of other open-source solutions as variables. Accordingly, the connection or dependency relationship between open-source solutions can be set simply. In addition, a firewall list can be automatically generated based on the connection relationship between open-source solutions. Therefore, an installation manager can complete the preparation for installation simply by inputting an IP and port of the equipment.

The installation package management module 400 can generate an installation package and an installation automation script using a binary file required for installation of each open-source solution, an environment setting file generated by converting an environment setting template file, an installation script file generated by converting an installation script template file, and an initial data generation script file generated by converting an initial data generation script template file. Accordingly, an installation manager can install each open-source solution on a number of pieces of equipment in parallel at a time without accessing each piece of equipment to install the open-source solution. This can reduce the time required for installation.

Figure 17:
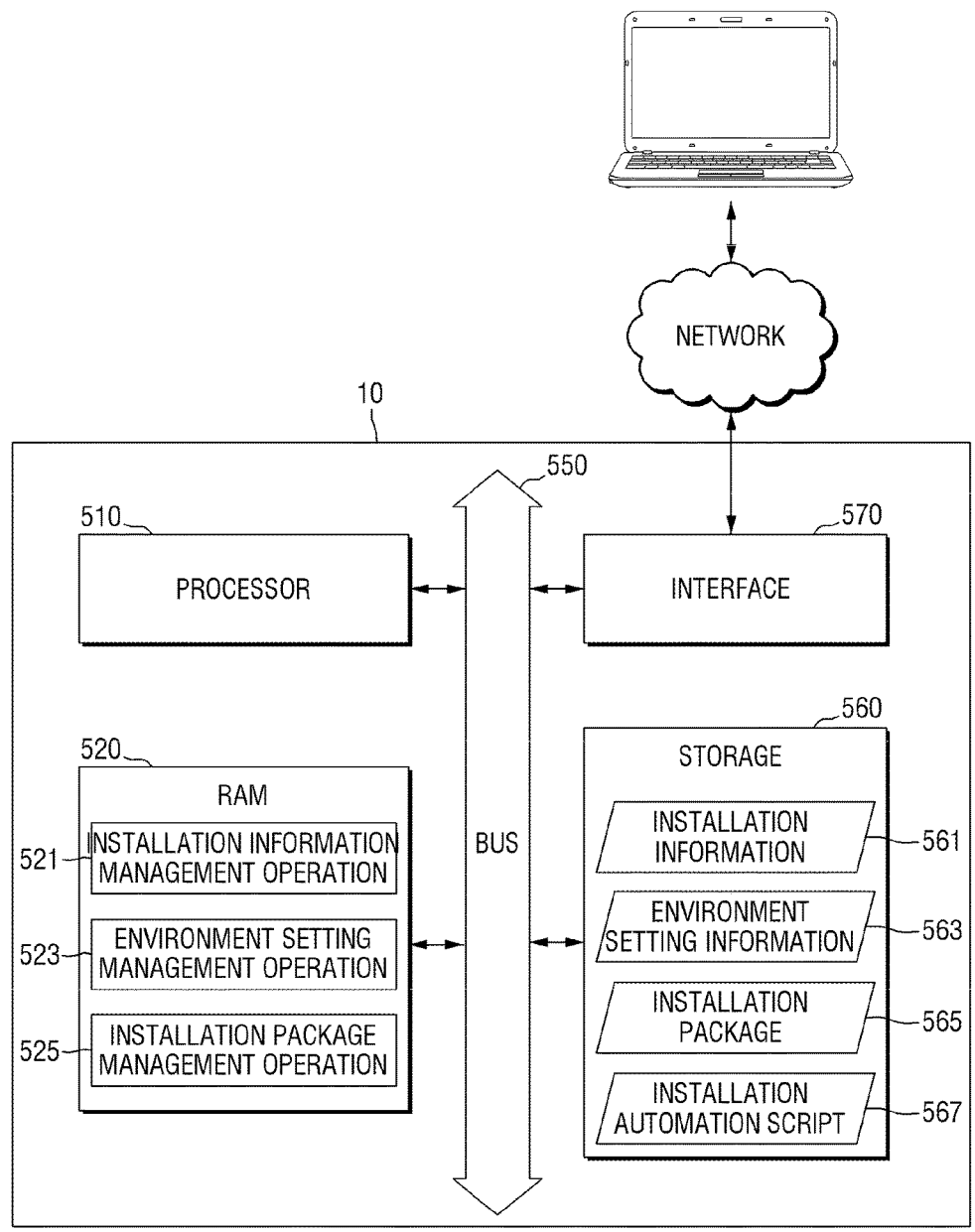
FIG. 17 is a diagram illustrating the hardware configuration of an apparatus for automating the installation and configuration of infrastructure according to an embodiment of the present invention.

FIG. 17 is a diagram illustrating the hardware configuration of an apparatus 10 for automating the installation and configuration of infrastructure according to an embodiment of the present invention.

Referring to FIG. 17, the apparatus 10 for automating the installation and configuration of infrastructure may include one or more processors 510, a memory 520, a storage 560, and a network interface 570. The processors 510, the memory 520, the storage 560, and the interface 570 exchange data with each other through a system bus 550.

The processors 510 execute a computer program loaded onto the memory 520, and the memory 520 loads the computer program from the storage 560. The computer program may include an installation information management operation 521, an environment setting management operation 523, and an installation package management operation 525.

The installation information management operation 521 receives installation information, which is open-source solution information, from a user through a network and stores the received installation information in a tree structure based on a parent-child relationship in installation information 561 of the storage 560. The installation information 561 stored in the storage 560 is used to generate an installation package 565 and an installation automation script 567.

The environment setting management operation 523 receives environment setting information, which is equipment information, from the user through the network and stores the received environment setting information in a tree structure based on a parent-child relationship in environment setting information 563 of the storage 560. The environment setting information 563 stored in the storage 560 is used to generate the installation package 565 and the installation automation script 567. In addition, the environment setting management operation 523 queries values of items received by the installation information management operation 521 using a unique identifier of the installation information 561 and a unique identifier of the environment setting information 563 and converts various template files into files customized for each piece of equipment and each open-source solution by replacing the items with the values. Accordingly, the installation and configuration of infrastructure can be automated with minimum user input.

The installation package management operation 525 generates the installation package 565 and the installation automation script 567 customized for each open-source solution for each piece of equipment using the installation information 561 managed by the installation information management operation 521 and the environment setting information 563 managed by the environment setting management operation 523. The installation package 565 and the installation automation script 567 generated as described above may be stored in the storage 560 through the system bus 550. Later, a user can establish infrastructure using the installation package 565 and the installation automation script 567.

According to the present invention, a user without relevant knowledge about an open-source solution can easily install the open-source solution. This is because information needed for the installation of the open-source solution is defined and managed in advance, and most of the information needed for the installation of the open-source solution is generated automatically to minimize user input.

In addition, user errors that may occur in the process of installing an open-source solution can be reduced, and the time required to install the open-source solution can be reduced. This is because an installation package with complete setting is automatically generated for each piece of equipment, and the open-source solution is installed automatically on each piece of equipment using the installation package.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. An apparatus for automating the installation and configuration of infrastructure, the apparatus comprising a processor performing operations comprising:
   receiving, by an installation information manager executed by the processor, installation information of an open-source solution installed on a plurality of equipment;
   managing the installation information in a first tree structure based on a first parent-child relationship;
   receiving, by an environment setting manager executed by the processor, environment setting information of the plurality of the equipment;
   managing the environment setting information in a second tree structure based on a second parent-child relationship;
   generating mapping information based on the first tree structure and the second tree structure;
   based on the mapping information, automatically generating a firewall list for each open-source solution that requires a firewall setting between each piece of the equipment; and
   generating an installation package, by an installation package manager executed by the processor, having an installation automation script based on the installation information and the environment setting information, the generated installation automation script comprises:
      a first installation script file for open-source solutions for a first equipment among the plurality of the equipment, wherein the first installation script is generated by replacing a variable of an installation script template file with an environment setting information corresponding to a tree node of the first equipment in the second tree structure and executed by the first equipment,
      a second installation script file for open-source solutions for a second equipment, wherein the second installation script file is generated by replacing a variable of the installation script template file with an environment setting information corresponding to a tree node of the second equipment in the second tree structure and executed by the second equipment, and
      the firewall list for the open-source solutions of the first and second installation scripts; and
      installing the generated installation package onto the first equipment and second equipment using the automation script wherein the installing further configures a firewall based on the firewall list between the first equipment and second equipment.

2. The apparatus of claim 1, wherein the operations further comprise assigning, by installation information manager, each item of the installation information a unique identifier based on the first tree structure and querying, by the installation information manager, a value of said each item using the unique identifier.

3. The apparatus of claim 1, wherein the operations further comprise receiving, by the installation information manager, from a user, a name, a description, and a service port of the open-source solution as items of the installation information.

4. The apparatus of claim 1, wherein the operations further comprise receiving, by the installation information manager, from a user, a binary file and a download uniform resource locator (URL) of the open-source solution as items of the installation information.

5. The apparatus of claim 1, wherein the operations further comprise receiving, by the installation information manager, from a user, the installation script template file of the open-source solution as an item of the installation information.

6. The apparatus of claim 5, wherein the installation script template file of the open-source solution is generated by replacing each item of the installation information and each item of the environment setting information in on the first installation script file provided with the open-source solution with unique identifiers.

7. The apparatus of claim 1, wherein the operations further comprise receiving, by the installation information manager, from a user, an environment setting template file, an environment setting fide name, and an environment setting file path of the open-source solution as items of the installation information.

8. The apparatus of claim 7, wherein the environment setting template file of the open-source solution is generated by replacing each of the items of the installation information and each item of the environment setting information in an environment setting file of the open-source solution with unique identifiers.

9. The apparatus of claim 1, wherein the operations further comprise receiving, by the installation information manager, from a user, a start command, a stop command, a status check command, and a status check result value of the open-source solution as items of the installation information.

10. The apparatus of claim 1, wherein the operations further comprise receiving, by the installation information manager, from a user, an initial data generation script template file of the open-source solution as an item of the installation information.

11. The apparatus of claim 10, wherein the initial data generation script template file of the open-source solution is generated by replacing each item of the installation information and each item of the environment setting information in an initial data generation script file of the open-source solution with unique identifiers.

12. The apparatus of claim 1, wherein the operations further comprise receiving, by the installation information manager, from a user, additional information of the open-source solution as an item of the installation information.

13. The apparatus of claim 1, wherein the operations further comprise giving, by the environment setting manager, each item of the environment setting information a unique identifier based on the second tree structure and querying a value of said each item using the unique identifier.

14. The apparatus of claim 1, wherein the operations further comprise wherein receiving, by the environment setting manager, from a user, a number of pieces of the equipment on which the open-source solution is to be installed and an installation path as items of the environment setting information.

15. The apparatus of claim 14, wherein the operations further comprise adding, by the environment setting manager, a node corresponding to each piece of the equipment to the second tree structure based on the a number of pieces of equipment and receiving, from the user, an Internet protocol (IP) and a service port of the node corresponding to said each piece of the equipment as said items of the environment setting information.

16. The apparatus of claim 15, wherein the IP of the node corresponding to said each piece of the equipment is automatically input as a value which increases sequentially whenever a new node is added.

17. The apparatus of claim 1, wherein the environment setting information comprises items of an environment setting file of the open-source solution.

18. The apparatus of claim 17, wherein the operations further comprise generating, by the environment setting manager, a unique identifier using an identifier of the open-source solution, an identifier of the equipment, an identifier of the environment setting file, and an identifier of each item and querying values of said items using the unique identifier.

19. The apparatus of claim 1, wherein the operations further comprise generating, by the environment setting manager, generates an installation script file by replacing a first unique identifier of each item of the installation information and a second unique identifier of each item of the environment setting information in an the installation script template file with values.

20. The apparatus of claim 1, wherein the operations further comprise generating, by the environment setting manager, an environment setting file by replacing a first unique identifier of each item of the installation information and a second unique identifier of each item of the environment setting information in an environment setting template file with values.

21. The apparatus of claim 1, wherein the operations further comprise generating, by the environment setting manager, an initial data generation script file by replacing a first unique identifier of each item of the installation information and a second unique value of each item of the environment setting information in an initial data generation script template file with values.

22. The apparatus of claim 18, wherein the operations further comprise automatically generating, by the environment setting manager, the firewall list for each open-source solution for each piece of the equipment based on the mapping information in response to the replacing a first unique identifier of said each item of the installation information and a second unique identifier of said each item of the environment setting information with values.

23. The apparatus of claim 1, wherein the operations further comprise generating, by the installation package manager, an individual installation package for each piece of the equipment which comprises an installation file and an environment setting file of an open-source solution for said each piece of the equipment.

24. The apparatus of claim 23, wherein the installation package comprises the individual installation package for said each piece of the equipment.

25. The apparatus of claim 1, wherein the operations further comprise generating, by the installation package manager, an individual installation automation script for each piece of the equipment which comprises an installation script file and an initial data generation script file of the open-source solution for said each piece of the equipment.

26. The apparatus of claim 25, wherein the installation automation script comprises the individual installation automation script for said each piece of the equipment.

27. A method of automating an installation and configuration of infrastructure, the method comprising:
    receiving installation information of an open-source solution installed on a plurality of equipment;
    managing the installation information in a first tree structure based on a first parent-child relationship;
    receiving environment setting information of the plurality of the equipment;
    managing the environment setting information in a second tree structure based on a second parent-child relationship;
    generating, by a computer, mapping information based on the first tree structure and the second tree structure;
    based on the mapping information, automatically generating, by the computer, a firewall list for each open-source solution that requires a firewall setting between each piece of the equipment;
    generating, by the computer, an installation package having an installation automation script based on the installation information and the environment setting information, the installation automation script comprises:
        a first installation script file for open-source solutions for a first equipment among the plurality of the equipment, wherein the first installation script is generated by replacing a variable of an installation script template file with an environment setting information corresponding to a tree node of the first equipment in the second tree structure and executed by the first equipment,
        a second installation script file for the open-source solutions for a second equipment, wherein the second installation script file is generated by replacing a variable of the installation script template file with an environment setting information corresponding to a tree node of the second equipment in the second tree structure and executed by the second equipment, and
        the firewall list for the open-source solutions of the first installation script and the second installation script; and
    installing the generated installation package onto the first equipment and the second equipment using the automation script, wherein the installing further comprises configuring a firewall based on the firewall list between the first equipment and the second equipment.

28. An apparatus for automating an installation and configuration of infrastructure, the apparatus comprising:
    a network interface;
    at least one processor; and
    a memory configured to store computer readable instructions executed by the processors;
    wherein the computer readable instructions executed by the processor comprise:
        receiving installation information of an open-source solution installed on a plurality of equipment;
        managing the installation information in a first tree structure based on a first parent-child relationship;
        receiving environment setting information of the plurality of the equipment; and
        managing the environment setting information in a second tree structure based on a second parent-child relationship;

generating mapping information based on the first tree structure and the second tree structure;

based on the mapping information, automatically generating a firewall list for each open-source solution that requires a firewall setting between each piece of the equipment;

generating an installation package having an installation automation script based on the installation information and the environment setting information, the installation automation scrip comprises:
- a first installation script file for open-source solutions for a first equipment among the plurality of the equipment, wherein the first installation script is generated by replacing a variable of an installation script template file with an environment setting information corresponding to a tree node of the first equipment in the second tree structure and executed by the first equipment,
- a second installation script fide for the open-source solutions for a second equipment, wherein the second installation script file is generated by replacing a variable of the installation script template file with an environment setting information corresponding to a tree node of the second equipment in the second tree structure and executed by the second equipment, and
- the firewall list for the open-source solutions of the first and second installation scripts; and installing the generated installation package onto the first equipment and the second equipment using the automation script, wherein the installing further comprises configuring a firewall based on the firewall list between the first equipment and the second equipment.

29. The apparatus of claim 28, further comprising:

a storage configured to store the installation information and the environment setting information.

* * * * *